July 30, 1957  J. F. JOY  2,800,968
AUTOMATIC STEPPER TYPE TRANSPORT DEVICE
Filed Feb. 28, 1950  10 Sheets-Sheet 5
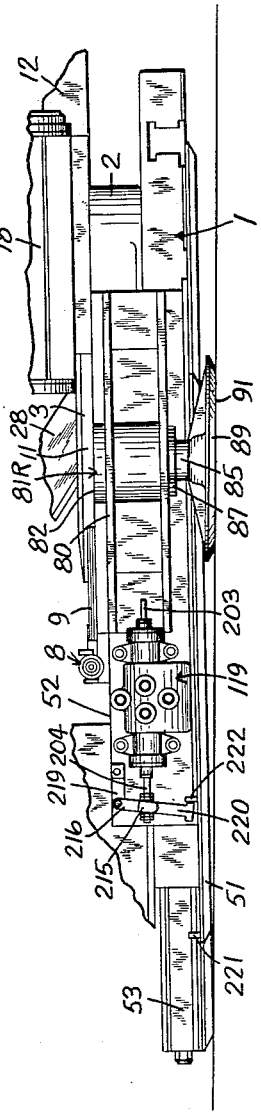
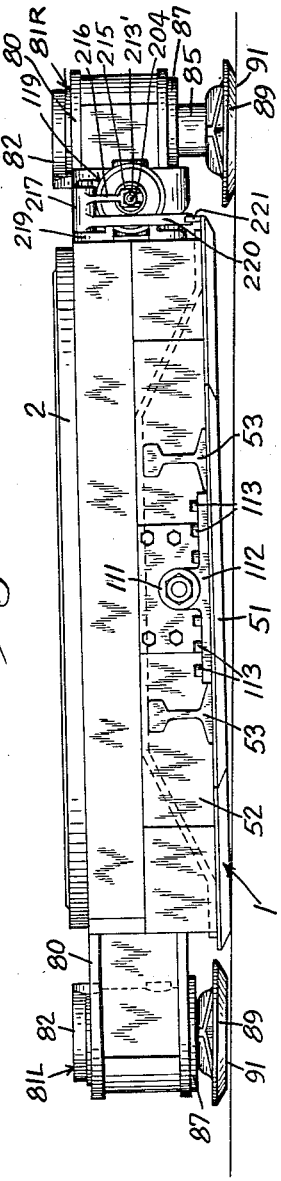
Inventor:
Joseph F. Joy.

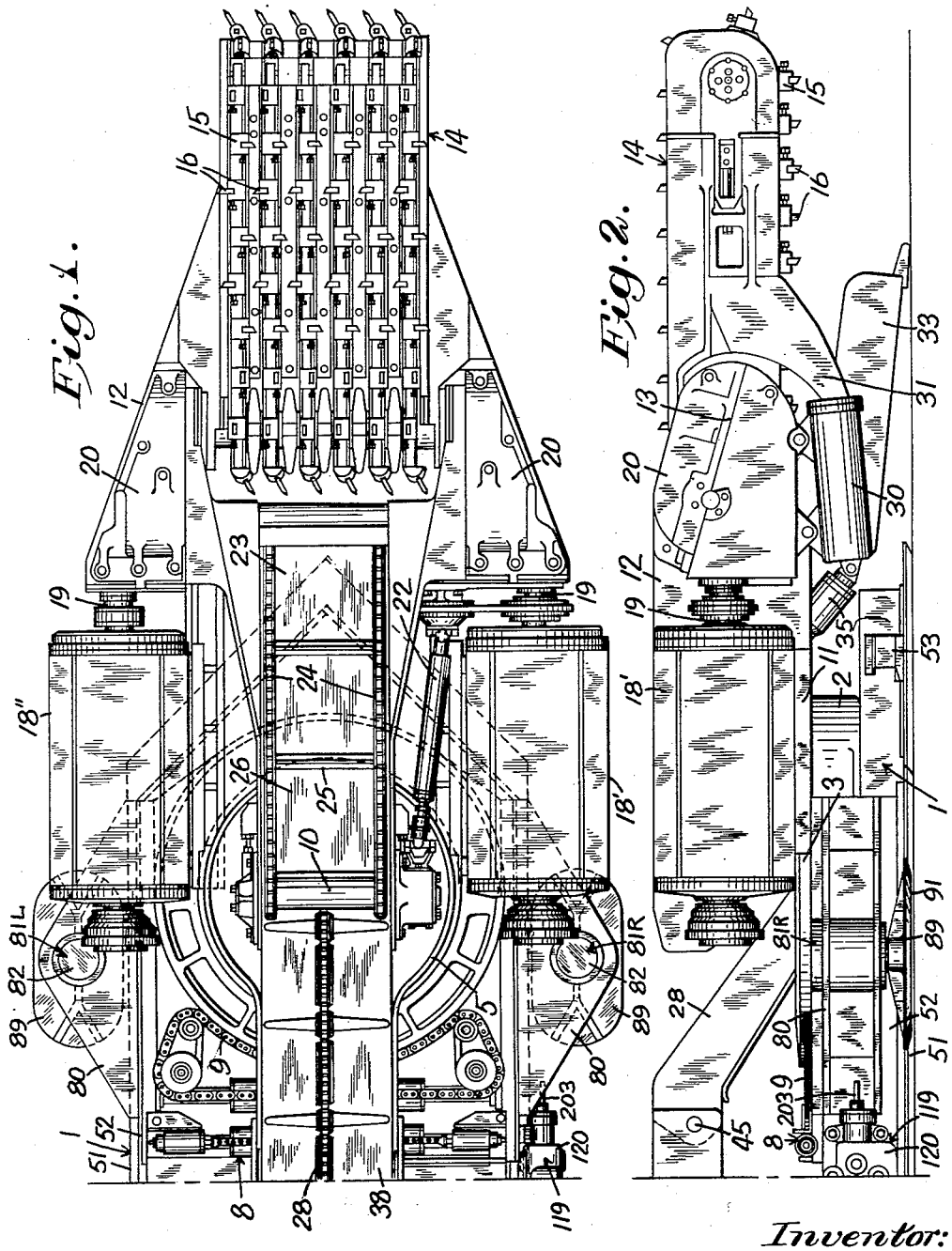

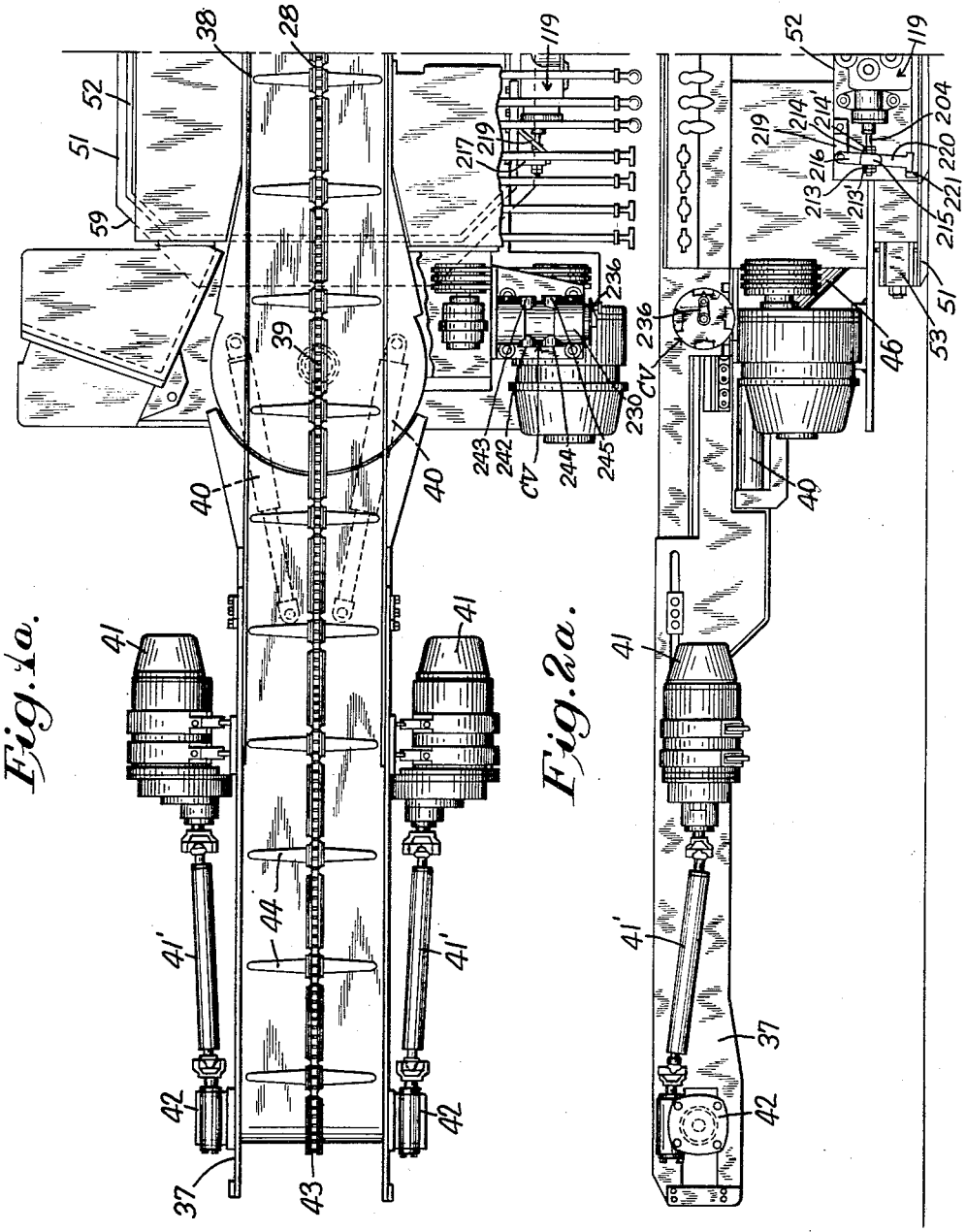

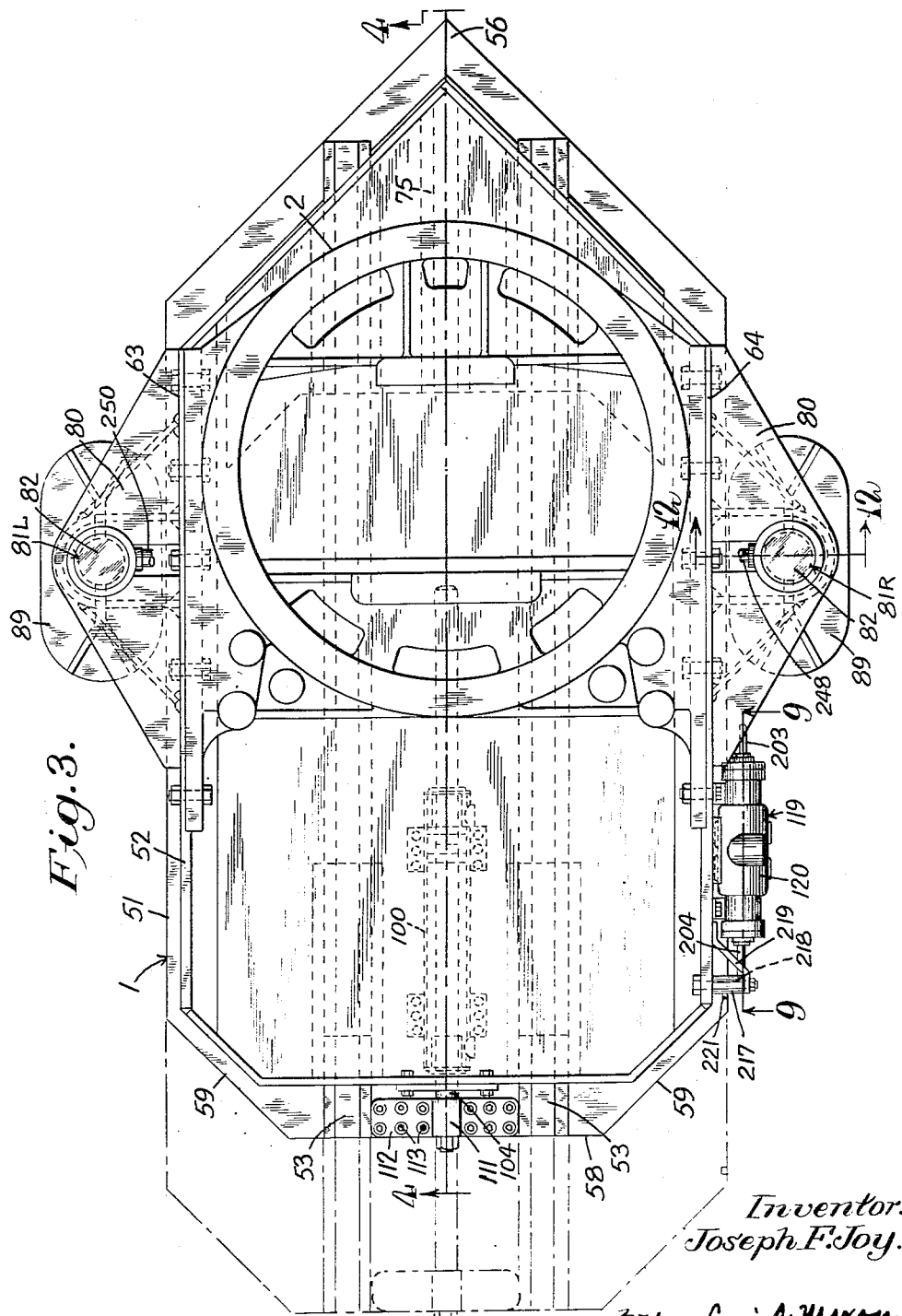

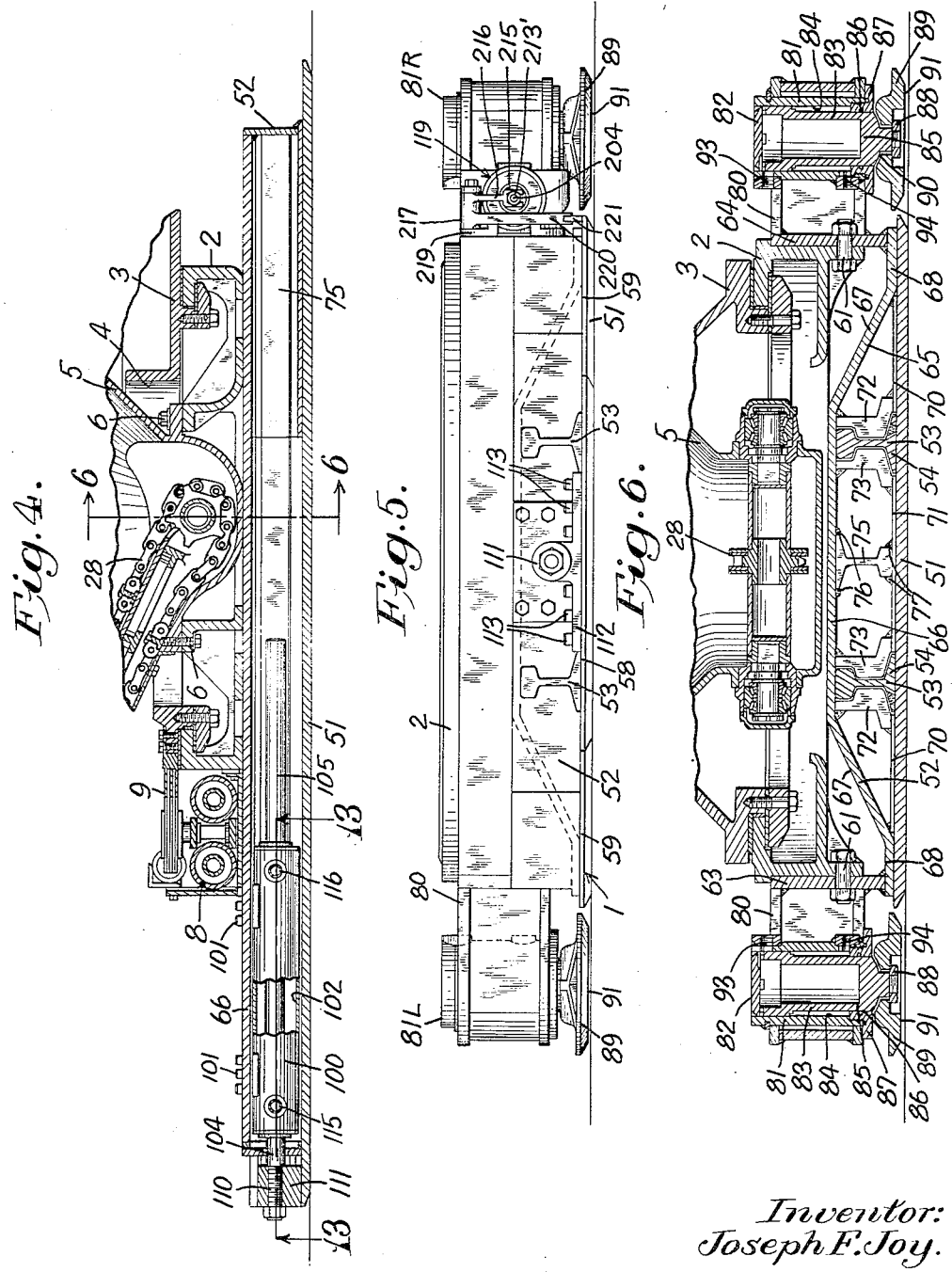

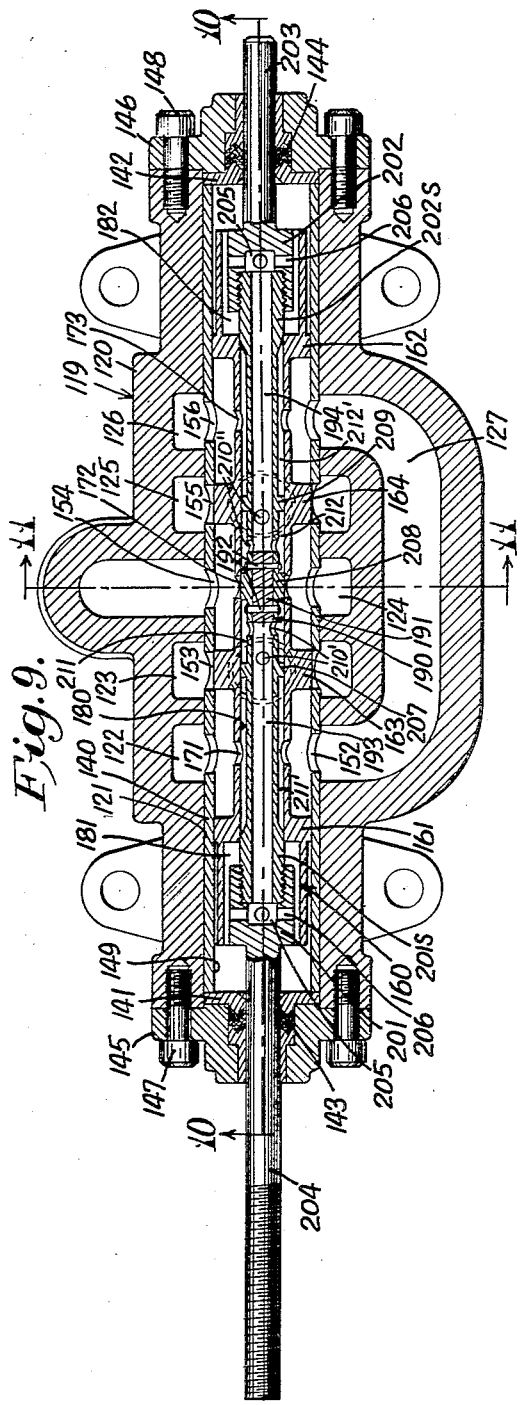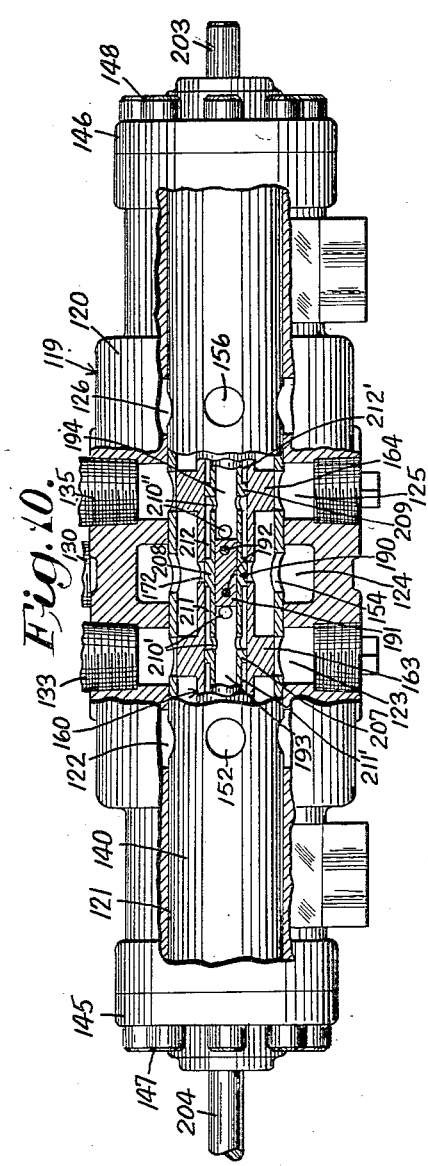

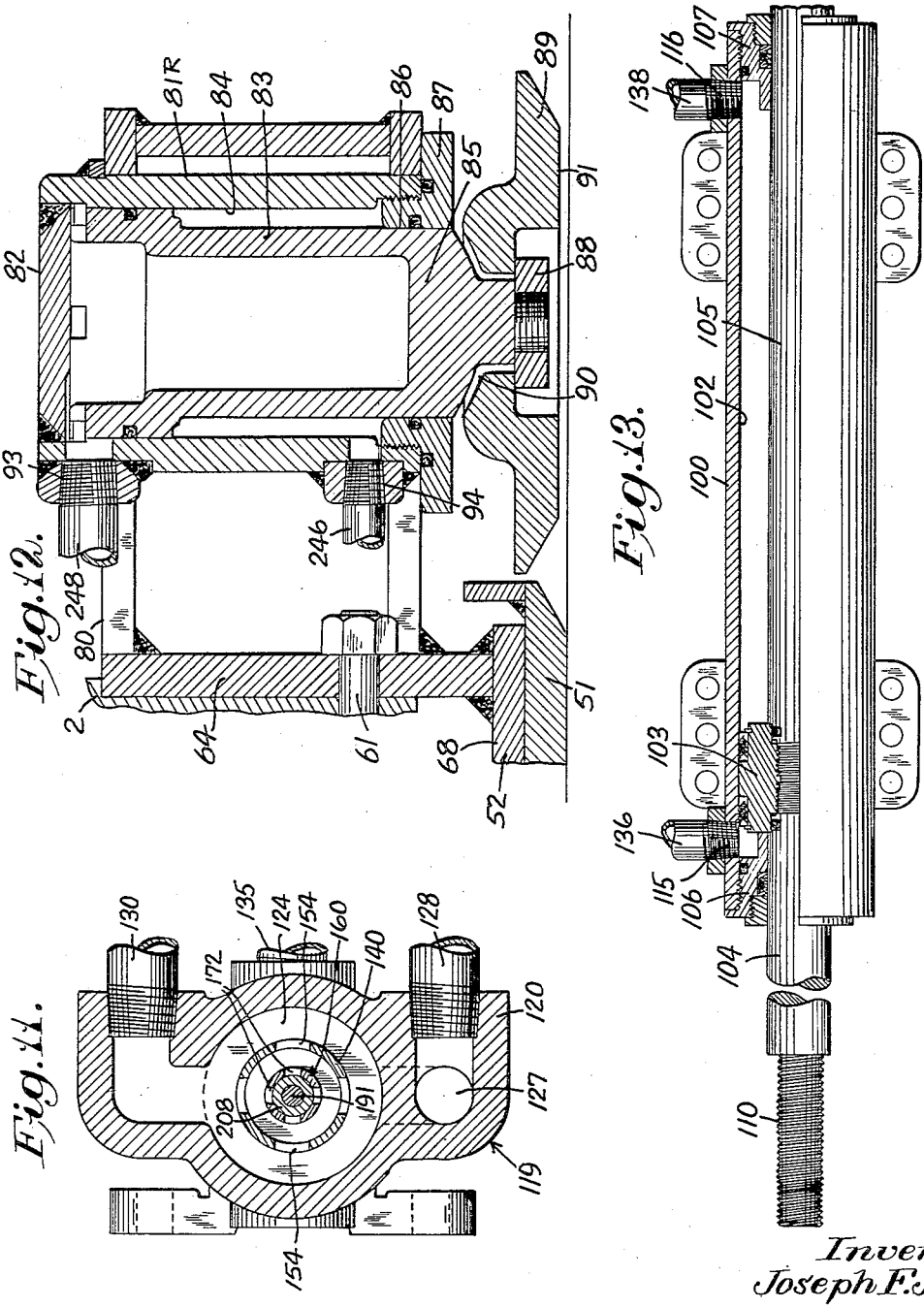

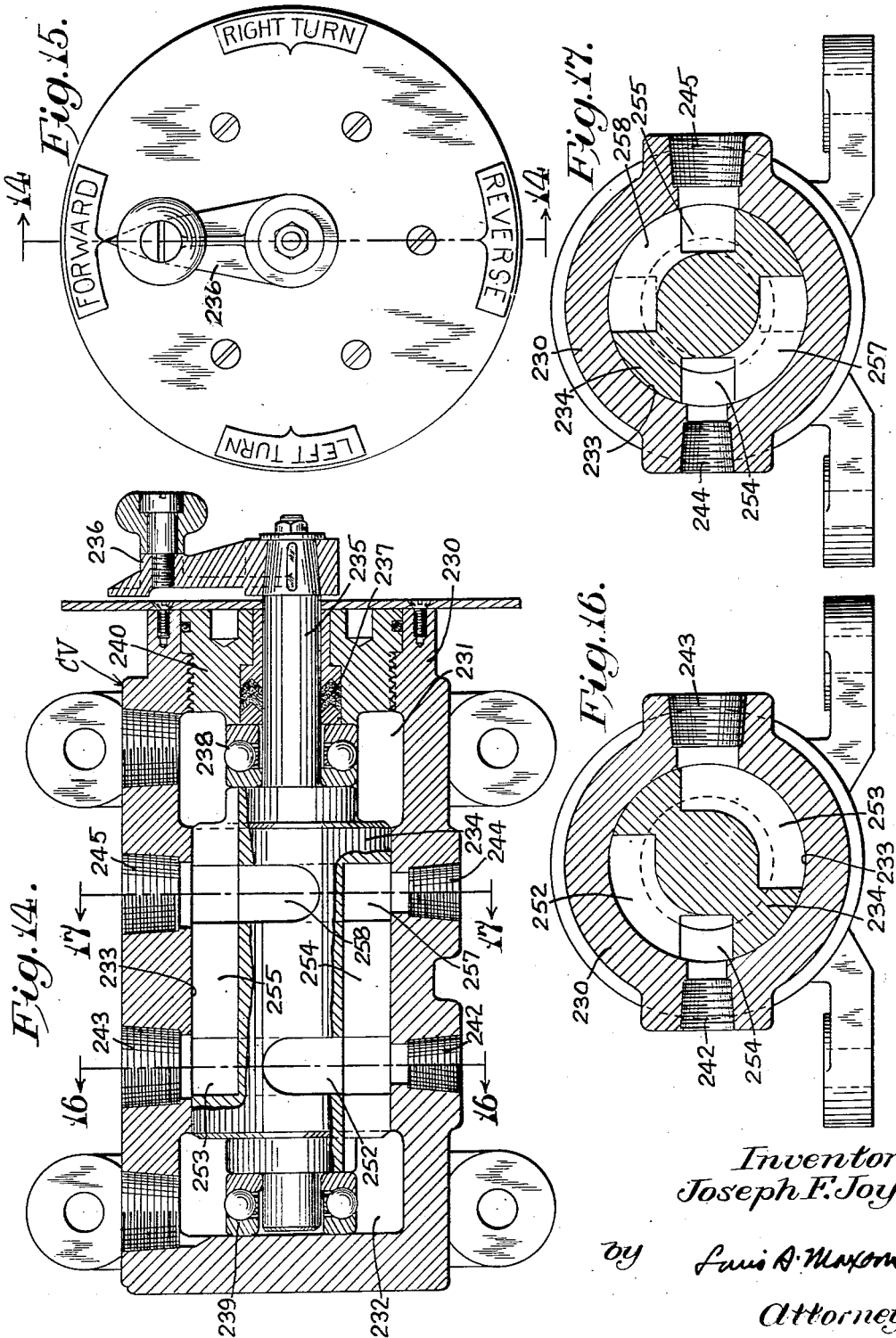

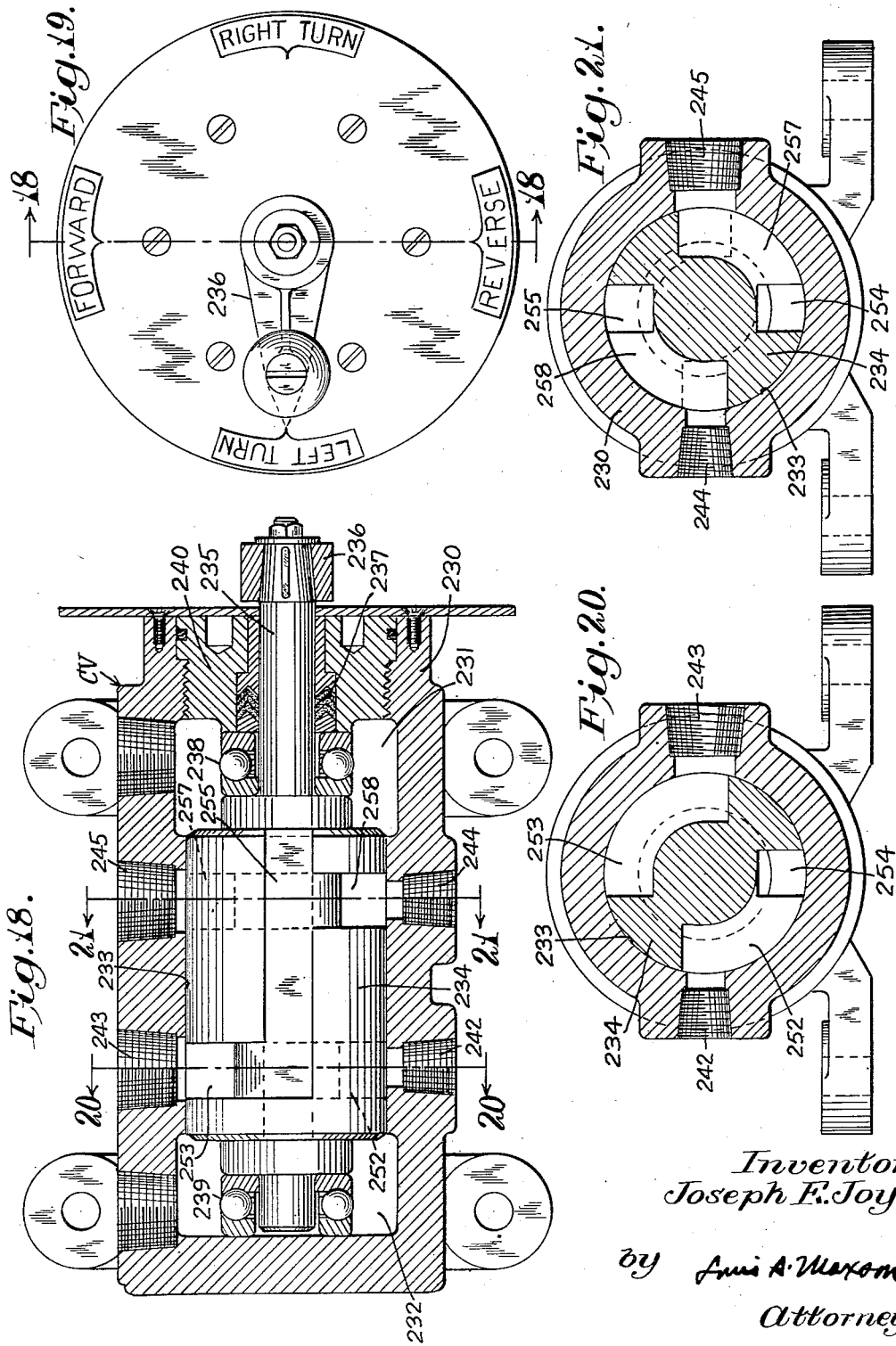

United States Patent Office 2,800,968
Patented July 30, 1957

2,800,968

AUTOMATIC STEPPER TYPE TRANSPORT DEVICE

Joseph F. Joy, Pittsburgh, Pa., assignor to Joy Manufacturing Company, Pittsburgh, Pa., a corporation of Pennsylvania Application February 28, 1950, Serial No. 146,885

11 Claims. (Cl. 180—8)

My invention relates to transport devices, and has particular utility for, though it is by no means confined to, feeding and re-positioning of mining apparatus. From this aspect it is very well adapted for the advancing, turning and other moving of continuous miners, so-called. From another aspect it relates to an improved method of moving transport devices in non-rectilinear paths.

Continuous miners, in a well-known embodiment thereof, incorporate a base adapted to be supported upon, steered relative to and traversed over a mine floor, and the base supports a disintegrating apparatus which is adapted to make a sumping attack on the coal or other mineral, and a succeeding swinging attack in vertical planes, and, ordinarily, finally, a withdrawing attack, the disintegrating apparatus being designed to deliver the material detached from the face to a conveying system which moves it back to a point to the rear of the apparatus and discharges it to a transport system such as one or more shuttle cars, a shaker conveyor system, or the like. The disintegrating apparatus is supported, as above noted, for rectilinear sumping and withdrawing movement and for vertical swinging movement, the disintegrating devices proper being supported on a reciprocable frame which is guided upon a turntable for radial movement with respect to the latter; and the turntable is rotatable about a vertical axis on the base so that the lines of sumping and withdrawal movement and the vertical planes of upswing may be changed in such a manner as to permit, through the removal of a series of vertical bands of coal or other mineral, the advance of the face. The conveying system may desirably include a front material-receiving conveyor for receiving material taken from the vein or seam and from the mine floor and other conveyor means for receiving the material from the front conveyor and delivering it at any desired position between the sides of the room or entry. Commonly, "caterpillar" or tractor type supporting and feeding means have been provided for the base, but the height of these—that is, the necessary vertical dimension—is a limiting factor in attaining a minimum overall height for the apparatus, and "caterpillar" or tractor drives and controls are not inexpensive, and from one aspect this present invention relates to the provision of an improved, inexpensive, readily controlled, low height, feeding, retracting and turning mechanism for a mining apparatus, and one which is particularly adapted to use with a continuous mining apparatus.

It is an object of my invention to provide an improved transport device. It is another object of my invention to provide an improved transport device particularly adapted for the support and maneuvering of continuous miners. It is a further object of my invention to provide an improved transport device of low construction. It is still another object of my invention to provide an improved transport device having improved and simplified feeding, retracting and direction changing mechanism incorporated therein. It is still another object of my invention to provide an improved transport device having improved and simplified feeding, retracting and direction changing mechanism incorporated therein. It is still another object of my invention to provide an improved transport device having a dirigible walking feed. It is yet a further object of my invention to provide an improved walking apparatus. It is still another object of the invention to provide improved, readily controlled advancing, retracting and direction changing walking feed mechanism. It is still another object of the invention to provide an improved walking feeding mechanism having improved means for controlling the speed, manner and radius of turning adjustment thereof. Still another object is to provide an improved method of effecting turning of a walking feed apparatus. Other objects and advantages of the invention will hereinafter more fully appear.

In the accompanying drawings, in which one illustrative embodiment of the invention, from its apparatus aspects, is shown for purposes of illustration:

Figs. 1 and 1a taken together provide a plan view of a continuous mining apparatus supported on the illustrative embodiment of my improved transport device.

Figs. 2 and 2a taken together provide a side view of the apparatus shown in Figs. 1 and 1a.

Fig. 3 is an enlarged plan view of the feeding and steering mechanism of the apparatus shown in Figs. 1, 1a, 2 and 2a, with all of the vein attacking and material conveying mechanism removed, and with other parts omitted.

Fig. 4 is a longitudinal vertical section on the plane of the section line 4—4 of Fig. 3 with a portion of a mining apparatus being shown on the transport device.

Fig. 5 is an enlarged rear end elevational view of the mechanism shown in Fig. 4, with parts omitted.

Fig. 6 is an enlarged transverse section on the plane of the line 6—6 of Fig. 4.

Fig. 7 is a fragmentary side elevational view, with parts broken away, showing the parts in position for rectilinear feed.

Fig. 8 is a view generally similar to Fig. 5, showing the parts in position for the making of a right turn, speaking in terms of forward advance.

Fig. 9 is a much enlarged longitudinal vertical sectional view on the plane of the line 9—9 of Fig. 3 but with the valve parts shown in mid-position.

Fig. 10 is a longitudinal horizontal sectional view, with parts shown in elevation, on the plane of the section line 10—10 of Fig. 9.

Fig. 11 is a transverse sectional view on the plane of the line 11—11 of Fig. 9.

Fig. 12 is a fragmentary vertical sectional view on a much enlarged scale, taken on the plane of the section line 12—12 of Fig. 3.

Fig. 13 is a fragmentary view, partially in section on the plane of the section line 13—13 of Fig. 4 and partially in elevation, and on a much enlarged scale, showing the traveling cylinder parts being shown in a different position.

Fig. 14 is a vertical section on the plane of the line 14—14 of Fig. 15 through the control valve for the walking mechanism.

Fig. 15 is a right-hand end view of the mechanism shown in Fig. 14.

Figure 22:
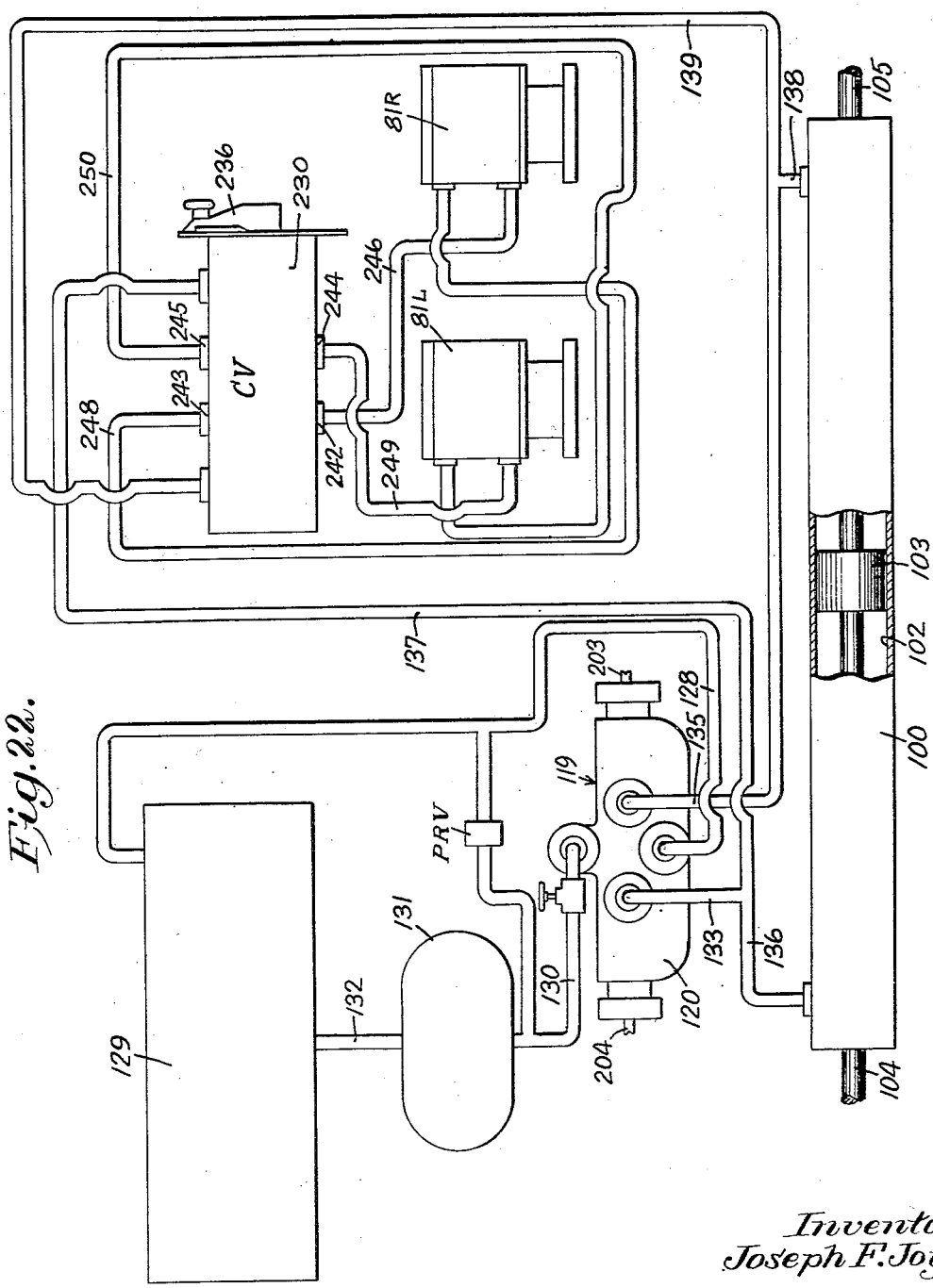

Figs. 16 and 17 are transverse sectional views respectively on the planes of the lines 16—16 and 17—17 of Fig. 14.

Fig. 18 is a view similar to Fig. 14 but showing the parts as they appear upon rotation of the control valve in a counter-clockwise direction through 90°, in terms of the position of the parts as indicated in Fig. 15, the section of Fig. 18 being in fact taken on the plane of the vertical section line 18—18 of Fig. 19.

Fig. 19 is a view from the right of the mechanism shown in Fig. 18.

Figs. 20 and 21 are vertical transverse sections, respectively on the planes of the lines 20—20 and 21—21 of Fig. 18.

Fig. 22 is a general diagrammatic view showing the hydraulic system of the supporting, feeding, and steering walking jack mechanism.

Referring first to Figs. 1, 1a, 2, 2a and 3, 4, 5, 6, 7 and 8, in which I have shown my improved transport device supporting a continuous miner, it will be observed that a suitable supporting, feeding and steering mechanism, generally designated 1, has secured thereto a turntable ring 2 upon which there is rotatably supported a turntable element generally designated 3. The turntable element has an open center, as at 4, and a hopper 5 is bolted to the element 2, as at 6. The rotatable turntable element 3 is provided with hydraulic swinging means 8 which employs a chain member or members 9 to effect its adjustment about a vertical axis 10. The turntable element includes a horizontally extending guiding portion 11 which supports for reciprocation radially of the turntable a sliding frame 12. The frame 12 supports, for swinging movement about a horizontal axis 13, a distintegrating mechanism 14, which includes, as illustrated, a plurality of circulating distintegrating chains 15 carrying disintegrating elements 16. The chains are circulated in their orbits by power derived from two motors 18′ and 18″ through extensible driving connections 19 and gearing (not shown) enclosed in gear housings 20. One of the motors, 18′, is connected through suitable transmission mechanism 22, with the front material receiving conveyor 23 which includes a pair of side chains 24 and intermediate flight elements 25, which flight elements are moved rearwardly over a suitable deck plate 26 and dump material into the hopper 5, from whence it is removed by another flight conveyor 28. The disintegrating mechanism is vertically swingable by cylinder and piston devices 30, supported from the front end of the reciprocable frame 12; the cylinder and piston devices being adapted to push in an outward and upward direction depending, rearwardly extending arms 31 fastened to the disintegrating apparatus 14. A bull-dozing shovel 33 is pivotally supported from the reciprocable frame 12, and the position of its forward end relative to the mine bottom may be altered by a cylinder and piston device 35 which is operable upon the supply of hydraulic fluid under pressure thereto, to depress the rearward end of the shovel mechanism 33 and raise the forward end thereof. The delivery flight conveyor 28 is of the flexible type and includes a rear end portion 37 which is pivotable relative to its forward portion 38 about an upright axis 39 under the action of lateral swing cylinders 40 pivotally connected to the swingable rear section 37 and to the non-swinging portion of the apparatus. Driving means for the rear conveyor is provided in the form of a pair of motors 41 which drive, through extensible connections 41′ and worm gearing (not shown) in casings 42, a chain 43 which carries the flights 44 which form the material moving devices of the delivery conveyor. The conveyor 28, as above noted, takes the material out of the hopper 5 and delivers it at the rear of the machine. The rearward end of the delivery conveyor is pivotable about a horizontal transverse axis 45 by a tilt jack 46.

Except for the support for the turntable, the entire structure described is contained in the disclosure of the John R. Sibley application Serial No. 102,996, filed July 5, 1949, owned by the assignee of the present invention.

The continuous mining apparatus described may be replaced by other suitable mechanism without departing from the broad scope of this invention, and it will be evident that the improved walking feed mechanism now to be described in detail can be used for the transportation of other apparatus.

The supporting, feeding, retracting and laterally repositioning mechanism of the apparatus described includes two relatively reciprocable frame parts 51 and 52. The parts 51 and 52 form a base for supporting the disintegrating apparatus. The part 51 consists of a skid plate on which the part 52, which constitutes a main base, rests when the part 51 is itself resting upon the mine floor. The part 51—the skid plate—is longer than the part 52—the main base—and underlies the latter. The part 51 has suitably secured to it, as by welding, a pair of guide members 53, herein shown in the form of sections of ordinary railroad rails having their bases 54 secured to the part 51. The skid plate is formed with a forward pointed end 56 and its rearward end includes a relatively straight, transverse extreme end portion 58 and a pair of oppositely beveled portions 59, 59. The frame or main base 52, to which there is shown bolted at 61 a portion of the base proper of the continuous mining apparatus above described, comprises upright side plates 63 and 64 suitably secured, as by welding, to a built-up bottom structure 65. The latter includes an upper, relatively horizontal, longitudinally extending, central plate portion 66 with down-bent side portions 67, and at the lower ends of these down-bent side portions are flat side strips 68 to which the upright plate portions 63 and 64 are secured and which are adapted slidably to contact the upper surface of the skid plate 51. Bottom plates 70 are welded at their outer edges to the inner sides of the portions 68 and, with an intermediate bottom plate 71, may provide mountings at the lower end of outer and inner guide elements 72 and 73 which cooperate with the rails 53 in the supporting and guiding of the frame 52. The upper ends of the elements 72 and 73 are welded to the plate portion 66. Centrally of the upper plate portion 66 there is welded an inverted rail section 75, the normal bottom of this rail being welded, as at 76, to the plate portion 66, and the head of the rail being welded at 77 to the plate 71.

Suitably secured, as by welding, to the side plates 63, 64 are brackets 80 which are adapted to provide mountings for vertical jack cylinders 81 having top heads 82 and further having pistons 83 reciprocable within their bores 84. The pistons 83 have piston rod portions 85 which extend through suitably packed openings 86 in lower heads 87 secured to the cylinders 81; and the lower ends of the piston rods have connected to them, as at 88, supporting or skid plates 89 which are pivotally connected, as at 90, to the lower ends of the piston rods in a manner which allows a deviation from a perpendicular relation between the axes of the piston rod portions 85 and the planes of the bottom surfaces 91 of the plates 89. The sizes of the plates mentioned will be determined by the loads which they are required to support upon the mine bottom. Fluid supply connections may be made with the tops and bottoms of the cylinder bores through suitable openings 93 and 94. The jack devices at the right and left-hand sides of the base, looking forwardly, will hereinafter be distinguished from each other by the use of the suffixes L and R.

What may for convenience be called a traveling cylinder 100 is suitably secured, as by screws 101, to the lower side of the plate portion 66, it being noted that the inverted rail 75 does not extend close to the rear of the main base 52. This traveling cylinder 100 has a bore 102 in which a piston 103 is reciprocable, and the piston 103 has piston rod sections 104 and 105 of like diameter extending from its opposite ends through the opposite heads 106 and 107 of the traveling cylinder. Rod section 105 plays no function other than a guiding one so far as the transmission of forces to any element is concerned, but the piston rod section 104 is suitably connected, as at 110, to an eye portion 111 on a plate 112 which is bolted, as by screw means 113, to the top of the skid plate 51. It will be evident, from what has been said, that if the jacks 81L and 81R are neither of them extended to bring the surfaces 91 into supporting engagement with the mine floor, the admission of fluid to one end or the other of the traveling cylinder will simply result in the reciprocation of the traveling cylinder 100 and of the base 52 to which it is attached, relative to the skid plate 51. If, however, as will later appear, the jack 81L has fluid supplied to its upper end, while fluid is supplied to the lower end of jack 81R, there will be a lifting of the left-hand side of the frame 52 about the opposite (right-hand) edge of the skid plate 51 as a point of support, and in this inclined position of the bottom skid only the edge portions of the latter remote from the extended jack 81L will contact the mine bottom. Correspondingly, if fluid is admitted to the top of the jack 81R and to the bottom of the jack 81L, then the skid plate 51 will be tilted about its left-hand edge while its right-hand edge will be lifted out of contact with the mine bottom. If fluid is supplied to both of the jacks 81L and 81R—to the top ends of the latter—then both sides of the skid plate 51 will, at least adjacent to the jacks, be lifted out of contact with the mine bottom. Different results will follow the admission of fluid to the traveling jack under the several different conditions mentioned, as will later be described. Desirably, the jacks will be located near the transverse line in which the center of mass of the apparatus lies when the traveling jack has moved the skid plate 51 to its forward-most position relative to the frame 52. Accordingly nearly all of the weight of the skid plate 51 may be lifted from the mine bottom if fluid is being simultaneously supplied to both of the jacks 81L and 81R.

The traveling jack has fluid connections 115 and 116 at its opposite ends, the former nearer the eye portion 111.

From the description so far given it will be easily appreciated that when both jacks have fluid applied to them at their upper ends, and fluid is supplied while these jacks are extended, through the connection 115 at the rear end of the traveling cylinder, the skid plate 51 will be drawn forward relative to the frame 52, and then when fluid is supplied through the connection 116 at the forward end of the traveling cylinder while fluid is vented from the jacks 81L and 81R, the frame 52 will be advanced rectilinearly relative to the skid plate 51, and thus forward feed in a straight line can be accomplished by admitting fluid through connection 115 and through both connections 93 while venting the connection 116 and both connections 94 and alternately concurrently supplying fluid to the connection 116 and the connections 94 while the connection 115 and the connections 93 are vented. Further, by admitting fluid to the top connections to the jacks 81L or 81R alternatively, and preferably thereafter or at least not earlier than concurrently, admitting fluid to the connection 116, angling of the support about the depressed jack will be occasioned, and this same angling movement will be continued if the other jack is depressed during the forward movement of the skid plate 51 relative to the frame part 52. These and other operations will, however, be more fully explained later.

The valve mechanism for controlling the distribution of fluid to the traveling cylinder 100 will now be described in sufficient detail to enable its mode of operation to be understood. This valve mechanism has been illustrated in other applications of mine, such as Serial No. 92,581, filed May 11, 1949, for Materials Handling Apparatus, now Patent No. 2,663,143, granted December 22, 1953, and in that one of these copending applications is perhaps more fully described. It will, however, be herein described sufficiently fully to enable its operation to be thoroughly understood. This valve mechanism, which is generally designated 119, includes a body 120. The body 120 constitutes a valve chest and has a generally cylindrical bore 121 extending throughout its length, and a number of internal peripheral grooves 122, 123, 124, 125 and 126 surround and communicate with the bore 121. The peripheral grooves 122 and 126 are joined by a passage 127, which passage connects with a return line 128 leading to a hydraulic fluid reservoir 129, about which more will be said later. The groove 124 is connected by a conduit 130 with the discharge of a hydraulic pump 131 of which the suction line 132 communicates with the reservoir 129. The grooves 123 and 125 communicate respectively, with conduits 133 and 135. Conduit 133 communicates with a branch conduit 136 leading to the rearward end of the traveling cylinder 100, and with another conduit 137 which communicates with a control valve CV later described. Conduit 135 communicates with a conduit 138 leading to the forward end of the traveling cylinder 100 and with a conduit 139 leading to the control valve CV. Bore 121 has a liner 140 extending for nearly the full length of the bore and abutting at its opposite ends against end liners 141 and 142 which constitute end portions of packing glands 143 and 144 which are housed in head members 145 and 146 held by machine screws 147 and 148 to the body 120. The liner 140 has a cylindrical bore 149, and is traversed by circumferentially arranged series of peripheral ports 152, 153, 154, 155 and 156, these communicating respectively with grooves 122, 123, 124, 125 and 126. A hollow main valve element 160 is reciprocable in the bore 149. It has end pistons 161 and 162 and a pair of intermediate cylindrical spool-like elements or portions 163 and 164. The end pistons and intermediate spool-like elements all fit the bore 149. The spool-like elements or spool portions 163 and 164 are so spaced that in the central position of the valve 160 they close completely the ports 153 and 155. When the main valve 160 is in either extreme position the spacing between the intermediate spools 163 and 164 is such that one or the other of the grooves 123 or 125 will be connected with the groove 124 while the other of the grooves 123, 125 will be connected, due to the spacing between the spools 163 and 164 and the adjacent pistons 161 and 162, with one or the other of the grooves 122 or 126. The main valve 160 is provided with ports 171, 172 and 173, these being arranged respectively between the piston 161 and the spool portion 163, between the spool portions 163 and 164, and between the spool portion 164 and the piston 162. The ports 171, 172 and 173 connect the spaces exterior to the hollow main valve with a bore 180, which extends through the main valve between chambers 181 and 182 in the pistons 161 and 162. The bore 180 does not actually effect communication between the chambers 181 and 182, and indeed these chambers do not at all times communicate with the bore 180, because of the presence of a pilot valve 190, shortly more fully to be described. In the central position of the main valve a common transverse plane cuts the ports 152 and 171, a common transverse plane cuts the ports 154 and 172, and a further common transverse plane cuts the ports 156 and 173. Within the bore 180 there is reciprocable the pilot valve 190. This pilot valve is hollow and is blocked substantially midway between its ends by a plug 191 held in place by means of pins 192 thus forming at the opposite ends of the pilot valve chambers or bores 193 and 194. The pilot valve is provided at its opposite ends with head elements 201 and 202, each of these having a stem integrally connected with it, one of the stems being numbered 203 and the other 204. These heads are chambered, as at 205, and have lateral ports, as at 206, which connect the chambers 181 and 182 respectively with the chambers 193 and 194.

The pilot valve 190 has formed thereon spool portions 207, 208 and 209. It also has portions at its ends, adjacent the heads 201 and 202, which fit the bore in which the pilot valve is received, both of which portions extend within the ends of such bore in the central position of the pilot valve relative to the main valve. These end portions are designated 201S and 202S. The spool portion 208 lies midway between the ends of the pilot valve. The spool portion 207 is relatively near the spool portion 208 and lies between the latter and the valve portion 201S. The spool portion 209 is relatively near the spool portion 208 and lies between the latter and the valve portion 202S. Peripheral grooves 211 and 212 surround the pilot valve respectively between the spool 208 and the spool 207, and between the spool 208 and the spool 209. Passages 210′ connect the bore 193 with the groove 211; passages 210″ connect the bore 194 with the groove 212. The pilot valve has other peripheral grooves: 211′ between the spool 207 and the portion 201S, and 212′ between the head or spool portion 209 and the portion 202S. The spool portion 208 is midway between the ends of the pilot valve 190, the spool portion 207 intermediate the spool portion 208 and the head element 201, and the spool portion 209 intermediate the spool portion 208 and the head element 202.

For the shifting of the pilot valve 190 the rearwardly extending stem 204 is provided with adjustably positioned spaced nuts 213 and 214, with which lock nuts 213′ and 214′ are associated; and a fork 215 carried at the lower end of a shifter arm 216 extends between the nuts 213 and 214. The shifter arm 216 is carried by a sleeve 217 journaled on a pin 218 carried by the part 52 by means of a mounting pad 219 secured to the part 52 towards the rearward end of the latter. The sleeve 217 carries another, longer lever arm 220, which is parallel to the arm 216 and which extends down far enough so that its lower end may be engaged alternately by stops 221 and 222 mounted in spaced relation to each other on the part 51. The spacing of the stops determines the length of the relative movement between the parts 51 and 52, and the relative movement between these parts may be changed, within limits, by changing the positions of the nuts 213, 213′ and 214, 214′ along the stem 204 which supports them. It will be evident that when the part 52 reaches the desired limit of its movement rearwardly relative to the part 51, the rearward stop, 221, will be engaged by the lower end of the lever arm 220, thus causing the pilot valve 190 to have its rearward movement interrupted, while the body 120 will briefly continue its rearward movement. This will result in a relative position of the pilot valve 190 to the right of that shown in Fig. 9, with a resultant admission of throwing fluid to the left-hand end of the main valve 160 while there will be a venting of the space to the right of the main valve 160. Thus this valve will move to a position relative to the body 120 to the right of that shown in Fig. 9, and fluid will be admitted through the conduits 135 and 138 to the right-hand end of the traveling cylinder 100 and effect movement of the part 52 forwardly relative to the part 51, or movement of the part 51 rearwardly relative to the part 52, depending on the operation of the jacks 81L and 81R. When the forward limit of relative motion is reached, the pilot valve's forward movement will be interrupted, the main valve will be thrown to the left of its position in Fig. 9 and supply fluid to the conduits 133 and 136 and cause movement of the part 52 rearwardly relative to the part 51, or movement of the part 51 forwardly relative to the part 52, depending on the operation of the jacks 81L and 81R. It will be noted that when fluid is admitted to the conduit 138 it is also admitted to the conduit 139, and when it is admitted to the conduit 136 it is also admitted to the conduit 137. The conduits 137 and 139 are connectible, as will now be described, in communication with the jacks 81L and 81R in various ways, so as to cause the relative movements of the parts 51, 52 to effect rectilinear forward feed, rectilinear rearward feed (retraction), or turning movement about either jack 81L or 81R at will.

Whether the base shall be advanced rectilinearly, retracted rectilinearly, or turned in one or another of various manners is governed by the control valve CV.

The following facts may be noted as a preliminary to a detailed consideration of the structure of the valve CV and its relation to the system of which it forms a part.

Rectilinear movements (1) To effect forward feed, the main base 52 must be moved forward, relative to the skid plate 51, while both jacks are collapsed, and then, when both jacks are extended, the skid plate must be advanced relative to the then stationary main base.

(2) To effect rearward feed, the main base 52 must be moved rearward, relative to the skid plate 51, while both jacks are collapsed, and then the skid plate must be moved back relative to the then stationary main base, while the jacks are extended.

Turns with the floor jacks extended and contracted in alternation

When the floor jacks are alternately extended and contracted different results occur, depending upon which floor jack is extended when the travel cylinder piston, and the skid, are pushed back.

(3) If the left floor jack is extended when the travel cylinder piston is pushed back, and the right floor jack is extended when the travel cylinder piston is pulled forward what may be called a counter-clockwise turn will be made, and the axis of turning, so to speak, remains between the jacks and relatively near a given point. What is meant by a counter-clockwise turn is that both the head end and the rear end of the apparatus trace curves in which they move in a direction opposite the direction in which the hands of a clock, lying on its back, would travel.

(4) When the travel cylinder piston is pushed back while the right floor jack is extended and pulled forward while the left floor jack is extended, a clockwise turn is made and the axis of this turn remains between the jacks and relatively near a single point.

Turns may also be made with only a single floor jack functioning, the same being extended during one relative movement between skid plate and main base and being contracted during the opposite such relative movement Before discussing individual turning movements of this type, it may be noted, as a general observation that when but one jack is functioning (and the other is idle) a point midway between the jacks traces a backward curve (backward, with respect to the front of the device) when the working jack moves backwards as the turn is being made, and a forward curve is made when the working jack moves forward when the turn is being made. The jacks of course move along the skid plate as the main base does, as they are supported by the main base.

(5) Now when the left jack only is extended and collapsed, the right jack remaining continuously collapsed, and the travel piston is pushed backwards and pushes the skid backwards when the left jack is extended, the device will turn counter-clockwise, using this term as previously explained, the device moving as it were backwards. A point midway between the jacks moves backwardly, and the turn takes place at a point which is probably actually outside the right jack and further from the path of travel of the left-hand jack than the distance between the jacks.

(6) When only the left jack is extended and contracted, the right jack remaining inoperative, and the travel piston is pulled forward when the left jack is down or extended, the device turns in a clockwise direction about a pivot at or near the right-hand jack, and a point on the device midway between the jacks is further ahead as well as further to the right at the end of the making of the turn.

(7) Now, when only the right floor jack is being extended and retracted and when the travel piston is pushed back when the right floor jack is extended, the machine turns clockwise, and the point about which pivoting takes place is at or near the jack which neither extends nor contracts. Now, a point midway between the jacks, at the end of a quadrant of turn, is further to the rear than before the commencement of the turn. In other words the turn is with the rear end of the apparatus first.

(8) When only the right floor jack is being extended and retracted and when the travel piston is pulled forwardly when the right floor jack is extended, the device turns counter-clockwise and the point about which pivoting takes place is at or near the left jack, which then neither extends nor contracts. Here a point midway between the jacks traces an arc and is further ahead, after a quadrant of turn, than when the turn was started.

Various references have been made to the floor jacks as being "extended." It will be understood, as later more fully explained, that this does not necessarily mean extended to the limit of potential extension.

It has been noted that the conduits 137 and 139 enter this control valve CV, and their communications with the control valve CV are indeed with the opposite ends of the casing of such control valve. The control valve includes a casing 230. This casing has an end chamber 231 with which the conduit 137 communicates. It has an opposite end chamber 232 with which the conduit 139 communicates. Between the end chambers there is a cylindrical bore 233 in which a rotary valve 234 is adapted to be turned by a rotary stem 235 and a handle 236. The stem is surrounded by suitable packing 237, and thrust bearings 238 and 239 arranged in the chambers 231 and 232 are provided for the purpose of centering the valve 234 with respect to the bore 233. The packing 237 is arranged within a sleeve portion 240 which constitutes an end closure for the annular chamber 231. The valve element 234 has been noted to be cylindrical. The casing 230 is provided with diametrically opposite connections 242 and 243 near one end of the valve bore 233 and with diametrically opposite connections 244 and 245 near the other end of the cylindrical bore 233. These may be variously connected with the jack cylinders, depending on the desired control sequence to be effected by rotation of the valve CV. The connections 242 and 243 are nearer the chamber 232 and the connections 244 and 245 nearer the chamber 231. The connection 242 communicates through a conduit 246 with the bottom of the right floor jack 81R. The diametrically opposite connection 243 communicates through a conduit 248 with the upper end of the right-hand floor jack 81R. The connection 244 communicates through a conduit 249 with the bottom of the left-hand floor jack 81L, while the diametrically opposite connection 245 communicates through a conduit 250 with the top of the left-hand floor jack 81L.

The valve 234 is provided in the transverse zone in which the connections 242 and 243 are arranged, with two arcuate grooves 252 and 253. A longitudinally extending groove 254 is formed in the periphery of the valve 234 and extends from a point near the right-hand end of the valve in Fig. 14 to the left-hand end and opens through the left-hand end of the valve into free communication with the chamber 232. The arcuate groove 252 extends, looking at the valve 234 from its right-hand end, clockwise from the longitudinal groove 254, about a quadrant. The arcuate groove 253 is connected with the chamber 231 by a longitudinal groove 255 formed in the periphery of the valve and extending from a point near the left-hand end of the valve, longitudinally of the latter, into communication with the chamber 231. Viewing the valve again momentarily from the right-hand end thereof in Figs. 14 and 18, the groove 255 communicates with and is disposed at the extreme counter-clockwise end of the arcuate groove 253, which extends about a quadrant clockwise from the longitudinal groove 255.

In the transverse planes of the connections 244 and 245 there are two more arcuate grooves formed in the valve, these being designated 257 and 258. The groove 257 extends about a quadrant counter-clockwise from the longitudinal groove 254, while the arcuate groove 258 extends about a quadrant counter-clockwise from the longitudinal groove 255. It will thus be noted that the grooves 252, 254 and 257 make a roughly Z-shaped groove arrangement having communication with the chamber 232, while the grooves 253, 255 and 258 make a roughly Z-shaped groove arrangement having communication with the chamber 231.

Figs. 14 to 17 show the relative position of the valve 234 with respect to the valve casing 230 for forward, rectilinear feed. It will be noted that when fluid is supplied to the chamber 231, with the parts in the positions of Figs. 14 to 17, fluid will be supplied to the longitudinal groove 255 and so, through the connections 243 and 245, to the tops of the right and left-hand jacks 81R and 81L. When fluid is being supplied to the chamber 231 it is vented from the chamber 232, so that since the groove 254 connects both of the connections 242 and 244 with the chamber 232, the bottoms of both of the jacks 81R and 81L will be connected to exhaust. The hydraulic pressure needed to extend the jacks 81L and 81R—i. e. to lift the cylinders of these jacks and the structure to which they are connected—is less than is required to effect movement between the cylinder 100 and piston 103 of the traveling jack 100 when the jacks 81L and 81R are fully collapsed, so the jacks 81L and 81R will lift the portions of the parts 51 and 52 which they are adapted to support before the traveling jack commences to effect movement between the parts 51 and 52. The greatly reduced load on the rear end of part 51 will accordingly allow this part to be advanced relative to the part 52. The lift need not—and indeed does not in practice—involve actual total separation of the part 51 from the underlying surface, for as soon as its reduced pressure on that surface is sufficiently diminished the relative movement between parts 51 and 52 can commence.

Now, at the end of the forward telescoping movement of part 51 relative to the part 52, the valve mechanism 119 will effect admission to the conduit 135 and venting of the conduit 133. Admission to the conduit 135 will result in the supply of pressure fluid to the chamber 232 while venting of the conduit 133 will result in venting of fluid from the chamber 231. With venting of fluid from chamber 231 the fluid previously supplied to the top of the jacks 81L and 81R will be vented, and with supply of fluid to the chamber 232, fluid will be delivered to the connections 242 and 244 and the jacks 81L and 81R will be collapsed and have their pads raised from the mine bottom or floor. Accordingly the part 51 will support the entire weight of the mining apparatus, and accordingly the supply of fluid through the conduit 138 to the forward end of the traveling jack 100 will result in the advance of the part 52 relative to the part 51, thus moving the mining apparatus supported on the part 52 forwardly. The process described, consisting of first removing most of the weight of the part 51 from the mine bottom and then moving this part forward relative to the jack-supported part 52, and then lowering the part 51 onto the mine bottom and moving the part 52 forward relative to it, may be repeated as necessary to effect rectilinear forward feed of the apparatus to the desired extent.

When the handle 236 is turned from the position shown in Fig. 15 through 180°, there will be effected such a change in the position of the valve 234 that when fluid is supplied to the chamber 231 it will be supplied simultaneously to the connections 242 and 244, with the result that the jacks 81L and 81R will be in their collapsed position and the part 51 will rest on the mine floor. Accordingly, the fluid then admitted to the rearward end of the traveling cylinder 100 will move the part 52 rearwardly relative to the part 51, and when the automatic valve 119 reverses its position and fluid is supplied through the conduit 135 to the forward end of the traveling jack 100 and to the chamber 232, the jacks 81L and 81R will be extended and the part 52 will be raised (note earlier comment on degree of jack extension and of raising), raising with it the part 51; and when, after this position of the parts is attained, the piston 103 of the traveling jack is moved rearwardly in the bore 102 of the traveling jack 100, the part 51 will be moved rearwardly relative to the part 52, which will remain stationary. It will now be noted that there will have been two successive rearward movements, a rearward movement of the part 52 relative to the part 51 while the latter rests on the mine floor, followed by a rearward movement of the part 51 relative to the part 52 while the latter is raised by the jacks 81L and 81R. Repetitions of these movements will effect rectilinear, rearward feeding movement of the apparatus as a whole.

Certain of the turning movements of the apparatus may now be described. If the handle 236 is turned 45° clockwise in Fig. 15, the groove 255, through the arcuate groove 258 will still have communication with the connection 245. The groove 254 through the arcuate groove 257 will still have communication with the connection 244. The connections 243 and 242 will be blanked off by the valve 234. In this position of the parts the top of the left jack will be supplied with fluid when fluid is supplied to the chamber 231 and effects relative telescopic or contracting movement between the skid plate and the main frame. Conversely, this left jack will be collapsed when fluid is supplied to the chamber 232 to effect relative extension between the skid and the base frame. It will be noted, from what has been said above, that, to make a right turn with the left jack functioning actively, the left jack should be extended during the telescoping or relative shortening movements between the skid plate and the main base, and that the left jack should be collapsed when the skid plate is caused to reach out again. Thus, with the connections described, a right turn—a clockwise turn—will take place.

By moving the handle 236 another 45° toward the right, that is, into a position at right angles to the line connecting forward and reverse, a right turn will be made while both jacks are functioning, the jacks being one extended while the other is collapsed and vice versa. In order that a left turn may be described as well as a right turn, however, I will describe specifically the turning action which is effected when the handle 236 is turned 90° counter-clockwise from the position shown in Fig. 15 to the position shown in Fig. 19. In the position of the valve 234 shown in Figs. 18, 20 and 21 and which corresponds to the position of the handle 236 shown in Fig. 19, it will be noted that the chamber 231 communicates through the groove 255 and the arcuate groove 253 with the connection 243, and also through the longitudinal groove 255 and the arcuate groove 258 with the connection 244. The connection 243 leads to the top of the right-hand jack and the connection 244 to the bottom of the left-hand jack. Thus, every time fluid is admitted to the chamber 231, the right-hand jack will be extended and the left-hand jack will be collapsed. When the chamber 231 is supplied with fluid the chamber 232 is connected back to the tank, and the chamber 232 communicates through the longitudinal groove 254 and arcuate groove 257 with the connection 245, and also through the longitudinal groove 254 and the arcuate groove 252 with the connection 242. Thus, when the chamber 232 is vented, the top of the left-hand jack and the bottom of the right-hand jack are vented, which is the proper condition for the extension of the right-hand jack and the collapse of the left-hand jack. Supply of fluid to the top of the right-hand jack and the bottom of the left-hand jack, venting of the bottom of the right-hand jack and top of the left-hand jack, and supply of fluid to the rearward end of the traveling cylinder 100, will result in a counter-clockwise arcuate movement about the right-hand jack. When the valve mechanism 119 has its position reversed the jack 81L will be extended and the jack 81R collapsed and fluid will be supplied to the forward end of the traveling jack 100. Under these circumstances, a further counter-clockwise rotation of the apparatus will take place and this rotation will take place about the axis of the jack 81L. It will be noted that the net rotation of the two counter-clockwise rotary movements amounts to somewhat the equivalent of a turning about an axis (not probably a stationary one) roughly midway between the axes of the jacks 81L and 81R.

From the description thus far given, it will be appreciated that by turning the handle 236 in either direction from the "Forward" position, apparatus turning in the direction of handle turning will be effected. Turns through 45° will result, depending on direction, in a right turn about the left jack or a left turn about the right jack. In the horizontal positions of the handle 236, apparatus turning to the right or left on an axis between the jacks will occur in the direction of handle turn, i. e. to the right when the handle is turned to its right horizontal position and to the left when the handle points horizontally to the left.

When the handle 236 is midway in the second quadrant, still another form of right turn will be effected, and when it is midway in the fourth quadrant a similar form of left turn will be effected. The operation when the handle 236 is in the 135° position may be described to illustrate these operations. Now only the bottom of the right jack and the top of the right jack will be able to receive fluid. When the top of the right jack is receiving fluid, the skid 51 and frame 52 will be increasing their overall length, i. e. the skid will be projected, and the apparatus will make a right turn. When the right jack is collapsed, the base will simply move rearwardly relative to the skid, without any turning. Thus the device as it were backs around to produce a right turn.

It will be noted that turns of three degrees of tightness may be effected. When a right turn is made with only the left jack working, or a left turn with only the right jack working, the turn will be a relatively wide one. When both jacks function during the turning, the turn is a tighter one, and when the turn is about the jack at the side corresponding with the direction of turn, a very tight turn will be made, the turn being made by a backing and turning process. The device may be caused to undergo a forward right turn, a forward left turn, a backward right turn, and a backward left turn, as well as advance and retract, and so to speak "turn on a dime" in either direction. Its low height, extreme manuverability, rugged construction, and control largely by a single valve render the device very well adapted to its various uses, including that of a transport device for a continuous miner.

Other operations may be effected, but the foregoing will sufficiently indicate the advantages of the invention and make clear the structure which is provided to enable the various movements to be effected. It will of course be understood that the turns may be made of larger radius by introducing short rectilinear feeding movements between successive turning movements as desired.

While there is in this application specifically described one form which the invention may assume in practice, it will be understood that this form of the same is shown for purposes of illustration and that the invention may be modified and embodied in various other forms without departing from its spirit or the scope of the appended claims.

What I claim and desire to secure by Letters Patent is:

1. In an apparatus of the character described, a skid plate, a main base, guiding means between said skid plate and said main base connecting them for relative reciprocation and for raising and lowering movements together, fluid operated raising and lowering devices mounted on said main base at opposite sides of the latter for raising and lowering the main base and the skid plate relative to a surface underlying the skid plate, a travel motor cylinder, a travel motor piston, passages leading to spaced points in said cylinder serving alternatively as fluid supply and venting passages to effect opposite relative movements between said cylinder and piston as supply of fluid is shifted from one of said passages to the other, said cylinder secured to one of said skid plate and main base and said piston secured to the other of said skid plate and main base whereby relative reciprocation between said cylinder and piston produces relative reciprocation between said skid plate and said main base, said fluid operated raising and lowering devices having conduits for supplying and venting of fluid relative to them, and means controlled by relative reciprocation between said skid plate and main base for effecting coordinate control of the supply of fluid and venting of fluid with respect to said passages and at least some of said conduits.

2. In an apparatus of the character described, a skid plate, a main base, guiding means between said skid plate and said main base connecting them for relative reciprocation and for raising and lowering movements together, fluid operated raising and lowering devices mounted on said main base at opposite sides of the latter for raising and lowering the main base and the skid plate relative to a surface underlying the skid plate, a travel motor cylinder, a travel motor piston, passages leading to spaced points in said cylinder serving alternatively as fluid supply and venting passages to effect opposite relative movements between said cylinder and piston as supply of fluid is shifted from one of said passages to the other, said cylinder secured to one of said skid plate and main base and said piston secured to the other of said skid plate and main base whereby relative reciprocation between said cylinder and piston produces relative reciprocation between said skid plate and said main base, said fluid operated raising and lowering devices having conduits for supplying and venting of fluid relative to them, and a distributing valve having means for reversing the position thereof automatically upon predetermined opposite relative movements between said cylinder and piston and controlling the distribution of fluid with respect to said passages and connectible to control fluid supply and venting of fluid through said conduits, and means for connecting certain of said conduits for control of fluid flow relative thereto by said distributing valve.

3. In an apparatus of the character described, a skid plate, a main base, guiding means between said skid plate and said main base connecting them for relative reciprocation and for raising and lowering movements together, fluid operated raising and lowering devices mounted on said main base at opposite sides of the latter for raising and lowering the main base and the skid plate relative to a surface underlying the skid plate, a travel motor cylinder, a travel motor piston, passages leading to spaced points in said cylinder serving alternatively as fluid supply and venting passages to effect opposite relative movements between said cylinder and piston as supply of fluid is shifted from one of said passages to the other, said cylinder secured to one of said skid plate and main base and said piston secured to the other of said skid plate and main base whereby relative reciprocation between said cylinder and piston produces relative reciprocation between said skid plate and said main base, said fluid operated raising and lowering devices having conduits for supplying and venting of fluid relative to them, and a distributing valve having means for reversing the position thereof automatically upon predetermined opposite relative movements between said cylinder and piston and controlling the distribution of fluid with respect to said passages and connectible to control fluid supply and venting of fluid through said conduits, and means for connecting said conduits for control by said distributing valve, in different arrangements.

4. In an apparatus of the character described, a skid plate, a main base, guiding means between said skid plate and main base connecting them for relative reciprocation and for raising, lowering and tilting respectively of said skid plate when raising, lowering and tilting movements of said main base occur, fluid-operated raising and lowering devices mounted on said main base for raising, lowering and tilting the latter and said skid plate relative to a surface underlying said skid plate, a fluid operated motor comprising a cylinder, a piston, passages leading to spaced points in said cylinder and a distributing valve controlling said passages and having actuating means rendering the same automatically operative on continued fluid supply thereto to effect a maintained relative reciprocation between said cylinder and piston, said cylinder secured to one of said skid plate and main base and said piston secured to the other of said skid plate and main base, whereby relative reciprocation between said cylinder and piston produces relative reciprocation between said skid plate and said main base, said fluid operated raising and lowering devices having conduits for the supply and venting of fluid relative to them, and means for selectively connecting said conduits in different arrangements with said distributing valve for control of fluid supply and venting through them by said distributing valve as the latter by its movements controls fluid distribution relative to said motor cylinder through said passages and maintains relative reciprocation between said cylinder and piston.

5. In an apparatus of the character described, a skid plate, a main base, guiding means between said skid plate and main base connecting them for relative reciprocation and for raising, lowering and tilting respectively of said skid plate when raising, lowering and tilting movements of said main base occur, fluid-operated raising and lowering devices having mutally corresponding ends and mounted on said main base, one at each side of the latter, for raising, lowering and tilting said main base and said skid plate relative to a surface underlying said skid plate, a fluid-operated motor including a cylinder, a piston, passages leading to spaced points in said cylinder and a distributing valve controlling said passages and having actuating means rendering the same automatically operative on continued fluid supply thereto to effect a maintained relative reciprocation between said cylinder and piston, said cylinder secured to one of said skid plate and main base and said piston secured to the other of said skid plate and main base, whereby relative reciprocation between said cylinder and piston produces relative reciprocation between said skid plate and said main base, said passages including a first passage fluid supply to which causes said skid plate to advance relative to said main base or said main base to retract relative to said skid plate dependent upon the distribution, upon an underlying surface, of the weight of said apparatus between said skid plate and said fluid operated raising and lowering devices, and a second passage fluid supply to which causes said skid plate to retract relative to said main base or said main base to advance relative to said skid plate dependent upon the distribution, upon an underlying surface, of the weight of said apparatus between said skid plate and said fluid-operated raising and lowering devices, and said fluid operated raising and lowering devices having for the supply and venting of fluid relative to them conduits as follows: a first conduit individual to the supply and venting of fluid relative to one end of the fluid operated raising and lowering device at one side of said base, a second conduit individual to the supply and venting of fluid relative to the other end of said fluid operated raising and lowering device at said one side of said base, a third conduit individual to the supply and venting of fluid relaitve to that end of the fluid operated raising and lowering device at the other side of said base which corresponds to the one end of the fluid operated raising and lowering device at said one side of the base and a fourth conduit individual to the supply and venting of fluid relative to the other end of said fluid operated raising and lowering device at said other side of said base, and means, including valve controlled fluid conducting means for establishing flow connections between said passages and conduits through which the pressure in said conduits is made to vary with the pressure in said passages, for coordinating the operation of said fluid operated raising and lowering devices with that of said motor, under the control of said distributing valve.

6. The combination defined in claim 5 in which said valve controlled fluid conducting means include fluid conducting means for connecting said first and third conduits to said first passage for control of the pressure therein by the pressure in said first passage and said second and fourth conduits to said second passage for control of the pressure therein by the pressure in said second passage.

7. The combination defined in claim 5 in which said valve controlled fluid conducting means include fluid conducting means for connecting said first and third conduits to said second passage for control of the pressure therein by the pressure in said second passage and said second and fourth conduits to said first passage for control of the pressure therein by the pressure in said first passage.

8. The combination defined in claim 5 in which said valve controlled fluid conducting means include fluid conducting means for connecting said first conduit with said first passage for control of the pressure in the former by that in the latter and said third conduit with said second passage for control of the pressure in the former by that in the latter.

9. The combination defined in claim 5 in which said valve controlled fluid conducting means include fluid conducting means for connecting said third conduit with said first passage for control of the pressure in the former by that in the latter and said first conduit with said second passage for control of the pressure in the former by that in the latter.

10. The combination defined in claim 5 in which said valve controlled fluid conducting means include fluid conducting means for connecting said first conduit with one of said passages for control of the pressure in the former by that in the latter and said second conduit with the other of said passages for control of the pressure in the former by that in the latter, with said third and fourth conduits being blanked off.

11. The combination defined in claim 5 in which said valve controlled fluid conducting means include fluid conducting means for connecting said third conduit with one of said passages for control of the pressure in the former by that in the latter and said fourth conduit with the other of said passages for control of the pressure in the former by that in the latter, with the first and second conduits being blanked off.

References Cited in the file of this patent

UNITED STATES PATENTS

| | | |
|---|---|---|
| 2,062,657 | Joy | Dec. 1, 1936 |
| 2,176,170 | Flower | Oct. 17, 1939 |
| 2,393,324 | Joy | Jan. 22, 1946 |